(12) United States Patent
Bang et al.

(10) Patent No.: US 10,114,167 B2
(45) Date of Patent: Oct. 30, 2018

(54) ULTRATHIN LIGHT UNIT

(71) Applicants: LG DISPLAY CO., LTD., Seoul (KR);
COVESTRO DEUTSCHLAND AG,
Leverkusen (DE)

(72) Inventors: Hyungseok Bang, Gyeonggi-do (KR);
Seungman Ryu, Gyeonggi-do (KR)

(73) Assignees: LG DISPLAY CO., LTD., Seoul (KR);
COVESTRO DEUTSCHLAND AG,
Leverkusen (DE)

( * ) Notice: Subject to any disclaimer, the term of this patent is extended or adjusted under 35 U.S.C. 154(b) by 429 days.

(21) Appl. No.: 14/932,456

(22) Filed: Nov. 4, 2015

(65) Prior Publication Data

US 2016/0139322 A1 May 19, 2016

(30) Foreign Application Priority Data

Nov. 19, 2014 (KR) ........................ 10-2014-0161895

(51) Int. Cl.
| | |
|---|---|
| *G02B 5/32* | (2006.01) |
| *F21V 8/00* | (2006.01) |
| *G02F 1/1335* | (2006.01) |
| *B29D 11/00* | (2006.01) |
| *G02B 5/00* | (2006.01) |

(Continued)

(52) U.S. Cl.
CPC ............ *G02B 6/0045* (2013.01); *G02B 5/32* (2013.01); *G02B 6/0035* (2013.01); *G02B 6/0043* (2013.01); *G02B 6/0046* (2013.01); *G02F 1/133615* (2013.01); *B29D 11/00663* (2013.01); *G02B 5/003* (2013.01); *G02B 5/188* (2013.01); *G02B 5/265* (2013.01); *G02B 6/003* (2013.01); *G02B 6/0031* (2013.01); *G02B 6/0051* (2013.01); *G02B 6/0055* (2013.01); *G02B 6/0065* (2013.01); *G02B 6/0068* (2013.01); *G02F 2201/08* (2013.01);

(Continued)

(58) Field of Classification Search
CPC ...... G02B 5/32; G02B 6/0045; G02B 6/0035; G02B 6/0043; G02F 1/133615
See application file for complete search history.

(56) References Cited

U.S. PATENT DOCUMENTS 7,520,652 B2 * 4/2009 Yamashita ........... G02B 6/0013
362/608
2004/0246743 A1 12/2004 Lee et al.
(Continued)

FOREIGN PATENT DOCUMENTS

| CN | 1742179 A | 3/2006 |
| CN | 102483522 A | 5/2012 |

(Continued)

*Primary Examiner* — Anabel Ton
(74) *Attorney, Agent, or Firm* — Dentons US LLP

(57) ABSTRACT

Provided is a thin light unit for a display device that includes, for example, a high refraction film including an inclined portion at a first side of the high refraction film and a flat portion extended from the inclined portion to a second side of the high refraction film; a second member on the inclined portion at the first side of the high refraction film and having a first width; a first member on the flat portion in a middle of the second side of the high refraction film and separated from the second member; a third member on the flat portion and having the first width; and a light source adjacent to the first member at a side of the flat portion.

17 Claims, 12 Drawing Sheets

(51) Int. Cl.
    *G02B 5/18*     (2006.01)
    *G02B 5/26*     (2006.01)
    *G03H 1/22*     (2006.01)

(52) U.S. Cl.
    CPC ............... *G02F 2203/023* (2013.01); *G03H 2001/2236* (2013.01); *G03H 2250/33* (2013.01)

(56) References Cited

U.S. PATENT DOCUMENTS

| | | |
|---|---|---|
| 2006/0056200 A1 | 3/2006 | Yamashita et al. |
| 2014/0036361 A1 | 2/2014 | Woodgate et al. |

FOREIGN PATENT DOCUMENTS

| | | |
|---|---|---|
| GB | 2463913 A | 3/2010 |
| JP | 2011181226 A | 9/2011 |
| JP | 2014011003 A | 1/2014 |
| KR | 10-2014-0077813 A | 6/2014 |
| TW | 201405175 A | 2/2014 |
| WO | 03/004931 A2 | 1/2003 |
| WO | 2010/035050 A1 | 4/2010 |
| WO | 2012/085730 A1 | 6/2012 |

\* cited by examiner

ULTRATHIN LIGHT UNIT

This application claims the priority benefit of Korean Patent Application No. 10-2014-0161895 filed on Nov. 19, 2014, which is incorporated herein by reference for all purposes as if fully set forth herein.

BACKGROUND OF THE INVENTION

Field of the Invention

The present disclosure relates to a display device and a light unit used for the same. More particularly, the present disclosure relates to an ultrathin light unit for a display device that is capable of providing a collimated light.

Discussion of the Related Art

Recently, a variety of technologies and researches for making and reproducing three-dimensional (3D) image/video have been actively carried out. Media relating to a 3D image/video is a new concept for virtual reality that is capable of further improving visual information and expected to lead to next generation display devices. A conventional two-dimensional (2D) image system merely reproduces an image and video data into a plan view, but a 3D image system can provide a full real image data to an observer. For this reason, 3D image/video technologies are the True North image/video technologies.

Typically, there are three methods for reproducing 3D image/video: a stereoscopy method, a holography method and an integral imaging method. Among these methods, the holography method uses laser beams so that it is possible to observe 3D image/video with naked eyes. The holography method is the most ideal method because it has an excellent visual stereoscopic property without any fatigue of the observer.

To produce the recording of a phase of a light wave at each point in an image, holography uses a reference beam which is combined with light from the scene or an object (an object beam). If these two beams are coherent, an optical interference between the reference beam and the object beam, due to the superposition of the light waves, produces a series of intensity fringes that can be recorded on a standard photographic film. These fringes form a type of diffraction grating on the film, which is called hologram. The central goal of holography is that when the recorded grating is later illuminated by a substitute reference beam, the original object beam is reconstructed (or reproduced), realizing a 3D image/video.

When a display system is implemented using a holographic technology according to the related art, it may be difficult to obtain evenly distributed brightness because an intensity of light radiated from a light source follows the Gaussian Profile. In addition, when the incident light from the light source has an inclined incident angle in order to reduce the high order diffraction components causing an image noise, a collimation degree of the laser may be reduce.

In order to address these drawbacks of the related art, researches have been made to provide a light unit that can provide a collimated light even when the incident light has an inclined angle for reducing high order diffraction components. For example, a system using a collimation lens has been presented.

FIG. 1A schematically illustrates a structure of a light unit that can provide a collimated light using a collimation lens according to the related art.

Referring to FIG. 1A, by disposing a point light source 30 at the position of the light source and positioning a collimation lens CL at the focal length position apart from the light source 30, the light radiated from the point light source 30 can be formed as a collimated light beam. This collimated light beam can be used as a reference light beam in a non-glasses type display system.

In most holographic display systems, it is, however, preferred that the reference light beam is incident on the diffraction optical element with an inclined angle from a vertical direction to the incident surface of the diffraction optical element. This is because, as the diffraction element such as a holographic film may generate the 0th mode image and/or 1st mode image that may work as noises in the holographic image, the 0th mode and/or the 1st mode can be reduced or eliminated by making the reference light beam being incident onto the diffraction element with an inclined angle. For example, the position of the point light source 30 may be shifted at any one side to make an inclined angle in the light unit shown in FIG. 1A.

FIG. 1B schematically illustrates a structure of a light unit generating a collimated light beam using a collimation lens, in which the collimated light beam has an inclined angle, according to the related art.

Referring to FIG. 1B, the point light source 30 is shifted or moved to upside from the light axis 130 so that the inclined angle from the light axis forwarding to the center of the lens CL may be α. Theoretically, as indicated by the dotted lines in FIG. 1B, the collimated light beam has the inclined angle α from the light axis 130. However, in actual cases, due to physical characteristics such as a spherical aberration, the real light path may not be collimated and/or paralleled with the inclined angle α, as indicated by the solid lines in FIG. 1B. As a result, the light beam from the light unit BLU may not be incident into the desired area and/or direction evenly, but be unevenly distributed over the incident surface of the diffraction optical element.

To address this problem, a method of combining the collimation lens with a prism sheet has been proposed to control the direction of the light from the light unit. Such a light direction controllable light unit is briefly described below with reference to FIG. 2.

FIG. 2 schematically illustrates a structure of a light unit that provides a collimated light beam of which direction can be controllable according to the related art.

The light direction controllable light unit BLU according to the related art comprises a collimated lens CL, a point light source 30 disposed at one side of the collimation lens CL and a prism sheet PS disposed at the other side of the collimated lens CL. The point light source 30 may be any type of light source that can radiate light in radial directions from one point. In order to direct most of the light from the point light source 30 to the collimation lens CL, a minor (not shown) may be further included at the back side of the point light source 30.

The point light source 30 can be preferably disposed at the focal plane of the collimation lens CL. Especially, the point light source 30 can be positioned on the light axis 130 connecting between the center point of the collimation lens CL and the center point of the focal plane of the collimation lens CL.

The collimation lens CL may change the light radiated from the point light source 30 into a collimated light beam 100. That is, the collimated light beam 100 may radiate in one direction parallel to the light axis 130. The collimation lens CL may include any optical lenses such as a Fresnel lens.

The prism sheet PS is preferably positioned opposite the point light source 30 with the collimation lens CL interposed therebetween. The prism sheet PS may refract or change the light propagation direction with certain angle α as being inclined with respect to the light axis 130. With the prism sheet PS, the parallel property of the collimated light beam 100 is maintained, and the propagation direction of the collimated light is redirected downward with an angle of α with respect to the light axis 130. As a result, the prism sheet PS can change the collimated light beam 100 into the controlled collimated light beam 200. The prism sheet PS may include a Fresnel prism sheet.

The light unit described above can be applied to a hologram 3D display or an ultrathin flat panel display such as a controlled viewing window display and so on. Particularly, the ultrathin flat panel display can be applied to various display systems. For example, as the viewing window can be controlled, it can be applied to a security display system in which display information is presented only to specific persons. As for another example, it can be applied to a multi-viewing display system in which different video data can be provided to different positions (or 'viewing areas'). Further, as the left eye image and the right eye image can be respectively provided to the left eye and the right eye without any interference, a good 3D display can be designed.

FIG. 3 schematically illustrates a structure of an ultrathin flat panel display according to the related art.

Referring to FIG. 3, the ultrathin flat panel display according to the related art comprises a display panel LCP representing video data and a light unit BLU. The display panel LCP may be a flat panel display using a light system, such as a liquid crystal display panel. The ultrathin flat panel display directs the display information represented on the display panel LCP into a certain area or specific viewing window. In order to control the viewing window, the light unit BLU is desired to control the radiating area of the light. For example, the light unit BLU may adopt the light control system shown in FIG. 2.

In detail, the light unit BLU for the ultrathin flat panel display according to the related art may include a light source LED, a lens LEN, a reflection plate REF and a holographic film HOE. To implement a holographic technology, it is preferable to use a highly collimated light beam, with the light source LED being a laser or a light emitting diode laser. When the light source LED is a general light emitting diode, a collimation lens LEN may be further included to obtain a collimated light beam. The holographic film HOE is to make the collimated light radiating to a specific viewing area. By radiating the light as a reference light beam onto the holographic film HOE, the light of which radiating area can be controlled according to the recording pattern of the holographic film HOE can be provided to the display panel LCP.

In order to develop a large-area ultrathin flat panel display, a large-area holographic film HOE is desired to be disposed at the back side of the large-area display panel LDP. Further, a reflection plate REF may be included to direct the light radiated from the light source LED and collimated by the collimation lens LEN to the large-area holographic film HOE.

As mentioned above, the ultrathin flat panel display includes the lens LEN and the reflection plate REF for optically converging and diverging the light. As a result, a physical space for ensuring enough light path may be required in order to provide a highly collimated light. That is, the light unit BLU according to the related art may require a large volume space, and thus, the ultrathin flat panel display according to the related art may also have a large volume space, thereby making it difficult to apply them to various display systems. Further, the light unit BLU may have a limited field of a controlled viewing window, thereby making it difficult to use as a general-purpose light unit.

SUMMARY OF THE INVENTION

Accordingly, the present invention is directed to a display device and a light unit used for the same that substantially obviate one or more problems due to limitations and disadvantages of the related art.

An advantage of the present invention is to provide an ultrathin light unit for a display device that is capable of providing a collimated light.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a display device having a display panel and a light unit, the light unit may, for example, include a high refraction film including an inclined portion at a first side of the high refraction film and a flat portion extended from the inclined portion to a second side of the high refraction film; a second member on the inclined portion at the first side of the high refraction film and having a first width; a first member on the flat portion in a middle of the second side of the high refraction film and separated from the second member; a third member on the flat portion and having the first width; and a light source adjacent to the first member at a side of the flat portion.

In another aspect of the present disclosure, a light unit for a display device may, for example, include a high refraction film including an inclined portion at a first side of the high refraction film and a flat portion extended from the inclined portion to a second side of the high refraction film; a second member on the inclined portion at the first side of the high refraction film and having a first width; a first member on the flat portion in a middle of the second side of the high refraction film and separated from the second member; a third member on the flat portion and having the first width; and a light source adjacent to the first member at a side of the flat portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts. A detailed description of known functions and configurations incorporated herein will be omitted when it may make embodiments of the present invention rather unclear.

In describing various embodiments of the present invention, the same components are representatively described in the first embodiment of the present invention and may be omitted in other embodiments.

<First Embodiment>

An ultrathin light unit according to the first embodiment of the present invention will now be described in detail with reference to FIGS. 4 to 12. In particular, a relationship between an ultrathin light guide film LGF and a light source LS will now be described in detail.

Figure 5:
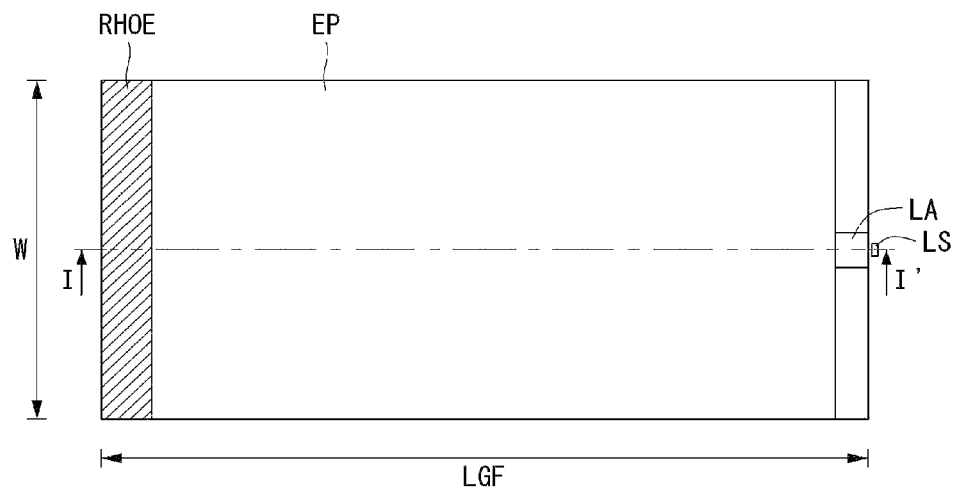
FIG. 5 is a plane view of the ultrathin light unit illustrated in FIG. 4 according to the first embodiment of the present invention.
Figure 6:
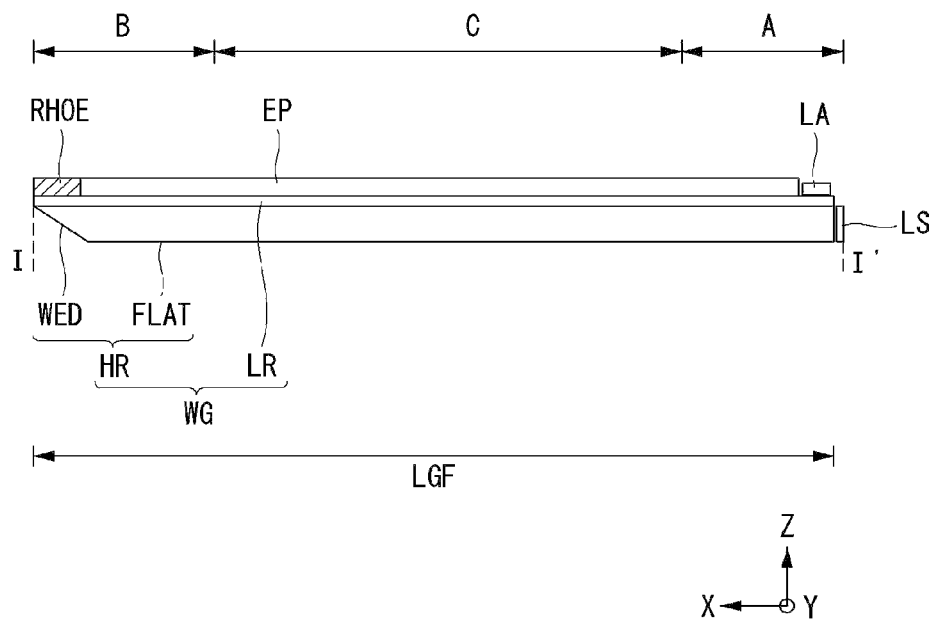
FIG. 6 is a side view taken along line I-I' of FIG. 5.

A structure of the ultrathin light guide film LGF and the light source LS constituting the ultrathin light unit according to the first embodiment of the invention will first be described with reference to FIGS. 4 to 6.

Figure 1A:
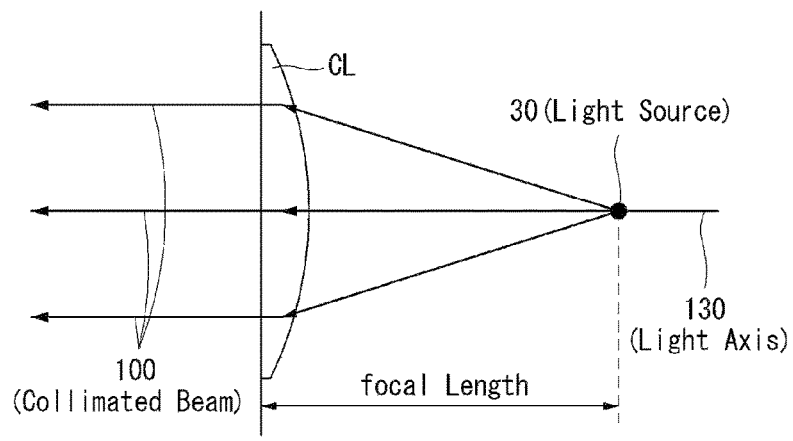
FIG. 1A is a diagram schematically illustrating a structure of a light unit generating a collimated light beam using a collimation lens according to the related art.
Figure 1B:
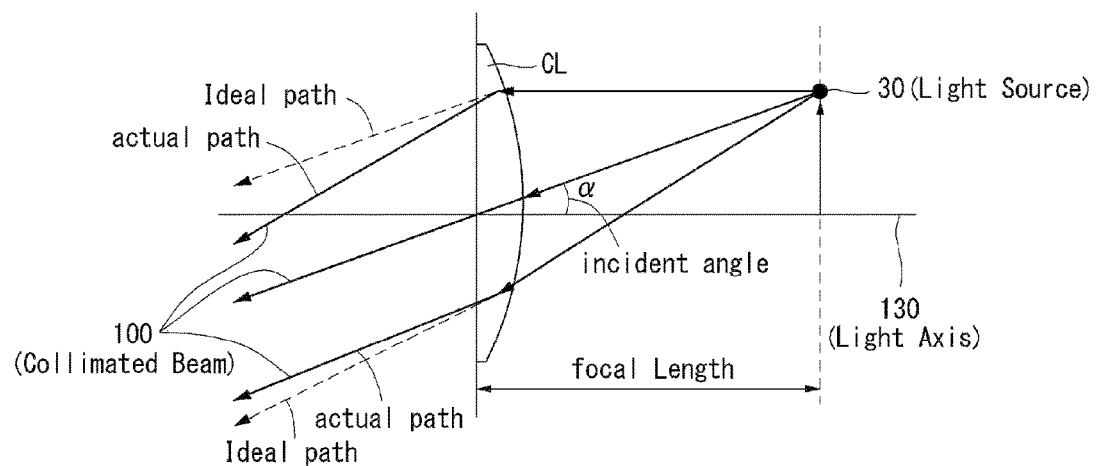
FIG. 1B is a diagram schematically illustrating a structure of a light unit generating a collimated light beam using a collimation lens, in which the collimated light beam has an inclined angle, according to the related art.
Figure 2:
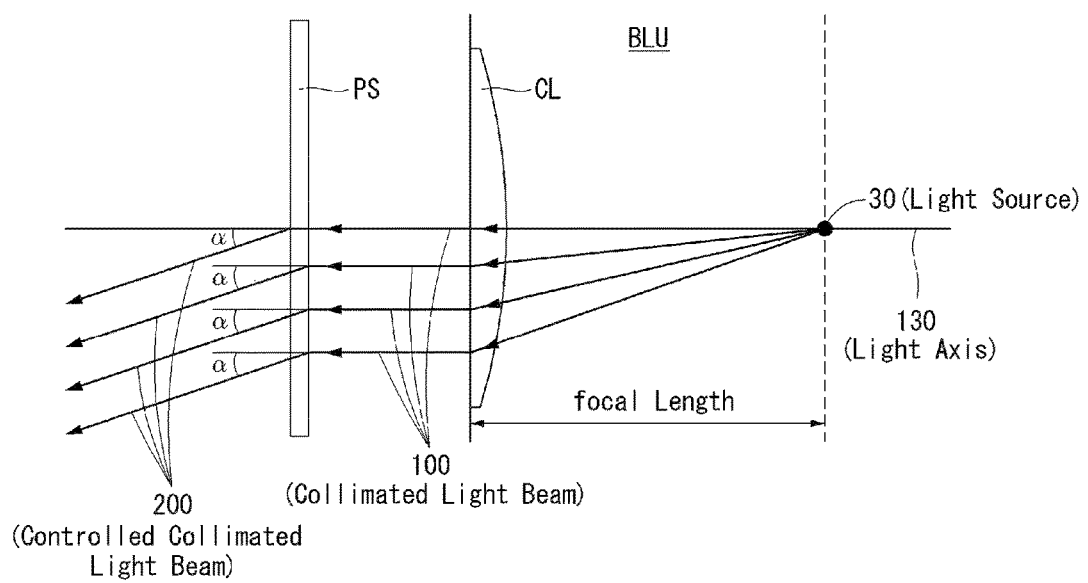
FIG. 2 is a diagram schematically illustrating a structure of a light unit providing a collimated light beam of which direction is controllable according to the related art.
Figure 3:
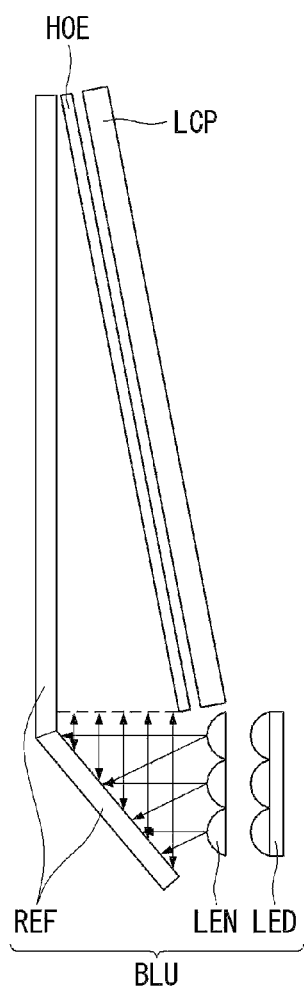
FIG. 3 is a side view schematically illustrating a structure of an ultrathin flat panel display according to the related art.
Figure 4:
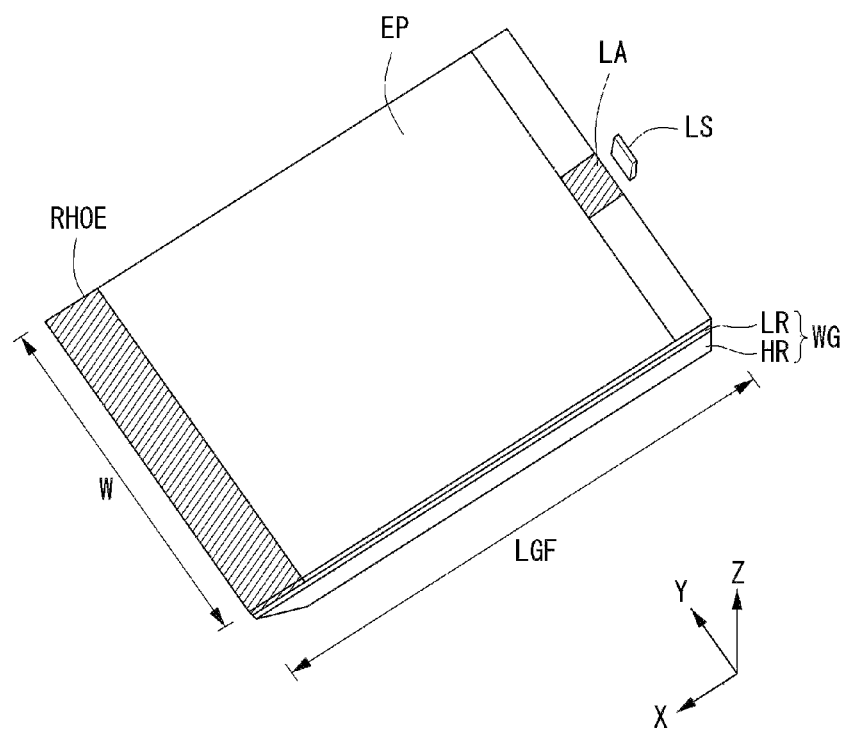
FIG. 4 is a perspective view schematically illustrating a structure of an ultrathin light unit according to the first embodiment of the present invention.

FIG. 4 is a perspective view schematically illustrating a structure of the ultrathin light unit according to the first embodiment of the invention. FIG. 5 is a plane view of the ultrathin light unit illustrated in FIG. 4 according to the first embodiment of the invention. FIG. 6 is a side view taken along line I-I' of FIG. 5.

The ultrathin light guide film LGF according to the first embodiment of the present invention includes a base film WG as a film type light guide medium or a wave guide medium inducing light and a second member RHOE, a third member EP, and a first member LA formed/disposed on an upper surface of the base film WG.

The base film WG having a first width W includes a high refraction film HR. The high refraction film HR includes an inclined portion WED at one side of the high refraction film HR and a flat portion FLAT extended from the inclined portion WED to the other side of the high refraction film HR and having a predetermined thickness. The base film WG further includes a flat low refraction film LR stacked on an upper surface of the high refraction film HR. The first member LA is formed in the middle of one side of the upper surface of the base film WG, and the second member RHOE having the first width W is formed on the other side of the upper surface of the base film WG. The third member EP having the first width W is formed in a remaining area excluding the first member LA and the second member RHOE from an entire upper surface of the base film WG. Herein, the second member RHOE is formed on a formation area of the inclined portion WED of the high refraction film HR.

A refractive index of the high refraction film HR is beneficially greater than a refractive index of the low refraction film LR, and a refractive index of the second member RHOE and a refractive index of the third member EP are similar to or slightly greater than the refractive index of the low refraction film LR. For example, the high refraction film HR may be formed of polycarbonate having a refractive index of 1.6, the low refraction film LR may be formed of UV resin having a refractive index of 1.43 to 1.5, and the second member RHOE and the third member EP may be formed of a material having a refractive index of 1.5. Other materials having various refractive indexes may be used for these elements.

The light source LS may use any light source having an emission area and a divergence angle similar to a light emitting diode (LED). Herein, a divergent LED is described, but the present invention is not limited thereto and may include various types of LEDs including a direct LED. By using such a divergent LED, the light efficiency of the light source LS can be improved, and the manufacturing cost can be reduced.

In this embodiment, the light source LS emits a white light using only a single white LED or a combination of three LEDs including red, green, and blue LEDs. For example, the red, green, and blue LEDs may be arranged in a line in a horizontal direction or vertical direction, or may be arranged in a triangular shape. Alternatively, a plurality of LEDs emitting a white light may be used to implement an ultrathin light unit having a high luminance, if desired. Alternatively, a plurality of sets each including a combination of three red, green, and blue LEDs may be used. Herein, one light source LS is used, so as to reduce the heat generation and increase the energy efficiency of the light source LS.

The light source LS is disposed on the side of the ultrathin light guide film LGF adjacent to the flat portion FLAT of the high refraction film HR. In the drawings, the light source LS is separated from the side of the high refraction film HR by a predetermined distance. However, if desired, the light source LS may be positioned adjacent to the high refraction film HR or may adhere to the high refraction film HR. In this instance, a position of the light source LS is beneficially designed in consideration of leakage of light from the light source LS incident on the high refraction film HR and damage on the high refraction film HR resulting from the heat generated from the light source LS. The light emitted from the light source LS is incident on the side of the high refraction film HR positioned opposite the light source LS.

The first member LA is formed on one side of the upper surface of the base film WG adjacent to the light source LS. The first member LA may absorb all of light beams having an incident angle less than a critical angle, which makes the total reflection occur at an interface between the high refraction film HR and the low refraction film LR, among the light beams emitted from the light source LS.

The second member RHOE is formed on the other side opposite the first member LA on the upper surface of the base film WG. Further, the second member RHOE is formed on the formation area of the inclined portion WED of the high refraction film HR. The second member RHOE may be formed by attaching a light diffraction film to the upper surface of the base film WG or applying a light diffraction layer to the upper surface of the base film WG. A reflective material may be used for the second member RHOE.

The third member EP is formed in a remaining area excluding the first member LA and the second member RHOE from an entire upper surface of the base film WG and emits light to the outside. The third member EP may be formed by attaching a light diffraction film to the upper surface of the base film WG or applying a light diffraction layer to the upper surface of the base film WG. Alternatively, the third member EP may be formed by directly applying or engraving a grating pattern on the upper surface of the base film WG.

The internal light transferred from the ultrathin light guide film LGF dividedly may travel in a divergence mode, a reflection mode, and an emission mode.

In the divergence mode, a divergent light emitted from the light source LS is incident on the inside of the high refraction film HR and travels toward the inclined portion WED (for example, in a direction of +X-axis) inside the high refraction film HR in a total reflection.

In the reflection mode, an angle of the divergent light incident on the inclined portion WED of the high refraction film HR is adjusted by a slope of the inclined portion WED, and thus the divergent light is not totally reflected from the upper surface of the high refraction film HR and travels to the second member RHOE. In this instance, the divergent light passes through the inclined portion WED and travels to the second member RHOE as a collimated light in a vertical direction. The divergent light, which passes through the inclined portion WED and is incident on the second member RHOE, is emitted to an inside of the high refraction film HR by the second member RHOE as a light collimated in the vertical and horizontal directions.

In the emission mode, the collimated light, which is emitted from the second member RHOE and is collimated in the vertical and horizontal directions, again passes through the inclined portion WED and adjusts its total reflection angle. The collimated light, of which the total reflection angle is adjusted, is not totally reflected from the upper surface of the high refraction film HR and travels between an upper surface and a lower surface of the ultrathin light guide film LGF in a direction of −X-axis through a total reflection. In this instance, a portion of the collimated light travelling through the total reflection reacts to the third member EP and is emitted to an outside of the ultrathin light guide film LGF.

Hereinafter, a process in which the light emitted from the light source LS travels inside the ultrathin light guide film LGF and is surface-emitted through the upper surface of the ultrathin light guide film LGF will now be described in detail with reference to FIGS. 7 to 12. The ultrathin light unit illustrated in FIG. 6 is divided into areas A, B, and C for a detailed description.

Figure 7A:
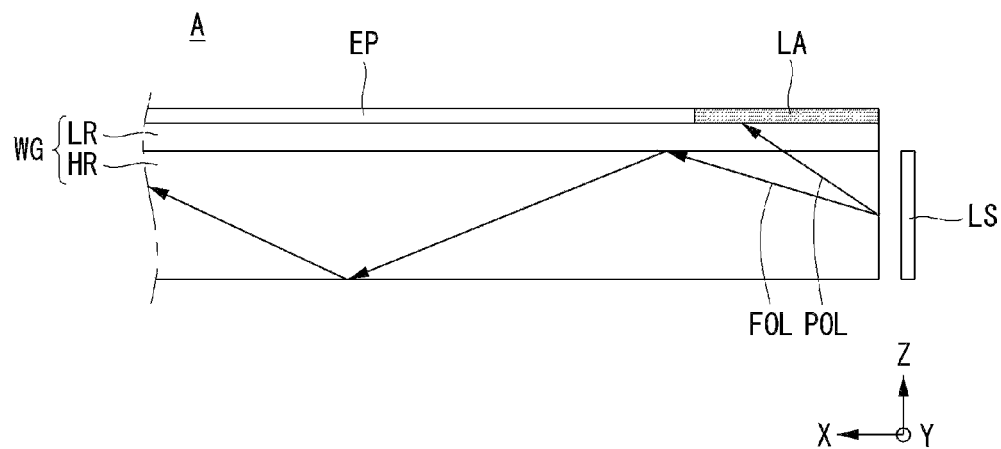
FIGS. 7A and 7B are enlarged side views illustrating that a divergent light beam emitted from a light source travels inside a high refraction film in an area A of the ultrathin light unit illustrated in FIG. 6 according to the first embodiment of the present invention.
Figure 7B:
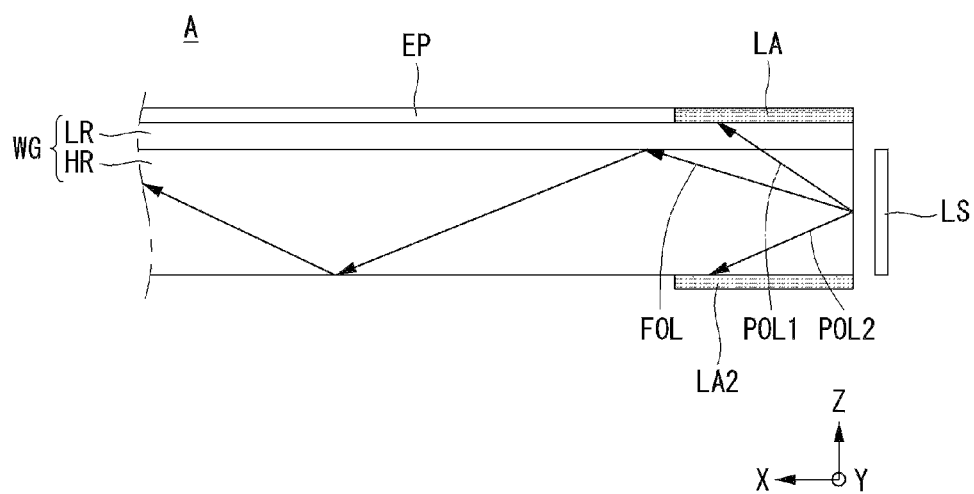
Figure 8:
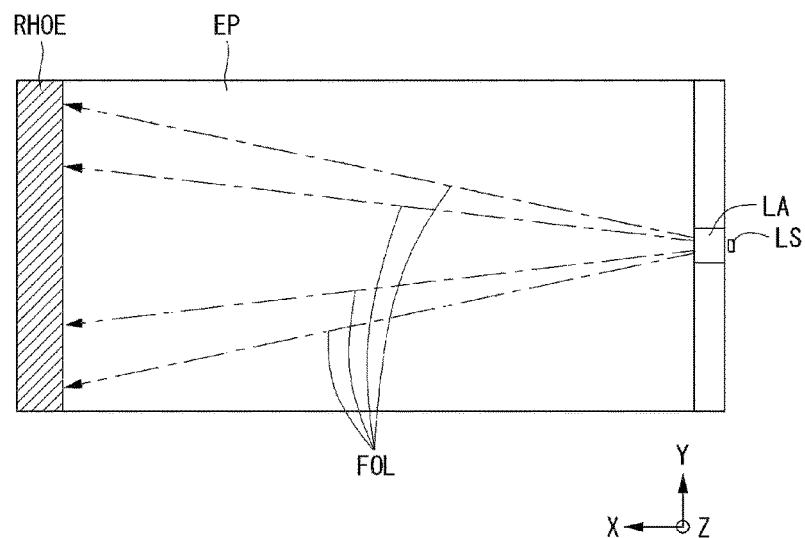
FIG. 8 is a plane view illustrating that the divergent light beam illustrated in FIGS. 7A and 7B travels on X-Y plane.

A travelling method of light in the area A will now be described in detail. FIGS. 7A and 7B are enlarged side views illustrating that a divergent light beam emitted from the light source LS travels inside the high refraction film in the area A of the ultrathin light unit illustrated in FIG. 6 according to the first embodiment of the invention. FIG. 8 is a plane view illustrating that the divergent light beam illustrated in FIGS. 7A and 7B travels on X-Y plane.

Referring to FIG. 7A, incident light beams FOL and POL emitted from the light source LS on the X-Y plane are incident on the side of the high refraction film HR and travel along X-axis on X-Z plane. Herein, light beams having an incident angle greater than a critical angle, which makes the total reflection occur at an interface between the high refraction film HR and the low refraction film LR, among the light beams emitted from the light source LS are called a divergent light beam FOL, and light beams having an incident angle less than the critical angle, which makes the total reflection occur at the interface between the high refraction film HR and the low refraction film LR, among the light beams emitted from the light source LS are called a transmitted light beam POL. Thus, the divergent light beam FOL travels toward the inclined portion WED (for example, in the direction of +X-axis) inside the high refraction film HR through the total reflection.

The transmitted light beam POL is not totally reflected at the interface between the high refraction film HR and the low refraction film LR and is transmitted as is. The transmitted light beam POL may be emitted to the outside as an uncollimated light. Thus, the transmitted light beam POL may not be adjusted for implementing a controlled viewing window and may be emitted as a scattered light. Hence, the first member LA is formed in the middle of the upper surface of one side of the base film WG adjacent to the light source LS, so as to block the transmitted light beam POL.

The first member LA is beneficially formed only in an area capable of sufficiently absorbing the transmitted light beam POL. The divergent light beam FOL is totally reflected at the interface between the high refraction film HR and the low refraction film LR and travels substantially without being affected by the first member LA. As a result, a length of the first member LA in the direction of X-axis may be properly set to a length capable of sufficiently absorbing the transmitted light beam POL.

For example, the length of the first member LA in the direction of X-axis may be determined in consideration of the critical angle of the total reflection between the high refraction film HR and the low refraction film LR. As the critical angle of the total reflection between the high refraction film HR and the low refraction film LR increases, the length of the first member LA in the direction of X-axis may increase. A width of the first member LA in a direction of Y-axis may be determined depending on a divergence angle of the light emitted from the light source LS. As the divergence angle of the light emitted from the light source LS increases, the width of the first member LA in the direction of Y-axis may increase.

Referring to FIG. 7B, when the first member LA is formed only on the upper surface of one side of the base film WG, a length of the first member LA in the direction of +X-axis may excessively increase. Namely, a transmitted light beam POL2, which is incident toward a lower surface of the high refraction film HR among transmitted light beams POL1 and POL2, may be totally reflected through a lower interface of the high refraction film HR and may be transmitted by an upper interface of the high refraction film HR.

In this instance, the length of the first member LA on the upper surface of the base film WG in the direction of +X-axis may unnecessarily increase, so as to absorb the transmitted light beam POL2. Thus, the ultrathin light guide film LGF may further include a lower first member LA2, which is positioned opposite the first member LA formed on the upper surface of one side of the base film WG. Namely, the lower first member LA2 is positioned on one side of the lower surface of the high refraction film HR. In this instance, the transmitted light beam POL1 travelling toward the upper surface of the high refraction film HR is absorbed by the upper first member LA, and the transmitted light beam POL2 travelling toward the lower surface of the high refraction film HR is absorbed by the lower first member LA2. Hence, the length of the upper first member LA can be reduced or prevented from excessively increasing.

The formation area of the first member LA may not contribute to implementing a controlled viewing window. Thus, the first member LA is beneficially formed only in a minimum area capable of receiving the transmitted light beam POL. In this instance, a lower low refraction film may be added between the lower first member LA2 and the high refraction film HR.

The side of the high refraction film HR adjacent to the light source LS may have a concentrating structure capable of concentrating light in the direction of +X-axis. For example, the high refraction film HR may have the concentrating structure using a parabola, etc. When the concentrating structure is used, a concentrated light may reach the inclined portion WED substantially without a loss. Hence, the light efficiency may increase. In particular, the light emitted from the light source LS beneficially has a divergence angle corresponding to the first width W of the inclined portion WED in consideration of a length of the base film WG in the direction of X-axis.

Referring to FIG. 8, the divergent light beam FOL emitted from the light source LS travels in a direction (for example, the direction of +X-axis) of the second member RHOE through the total reflection. A divergent distribution of light beams emitted from the light source LS beneficially has a distribution distributed from a light incident surface to the second member RHOE. However, the transmitted light beam emitted from the light source LS may be absorbed by the first member LA and may not travel.

Figure 9:
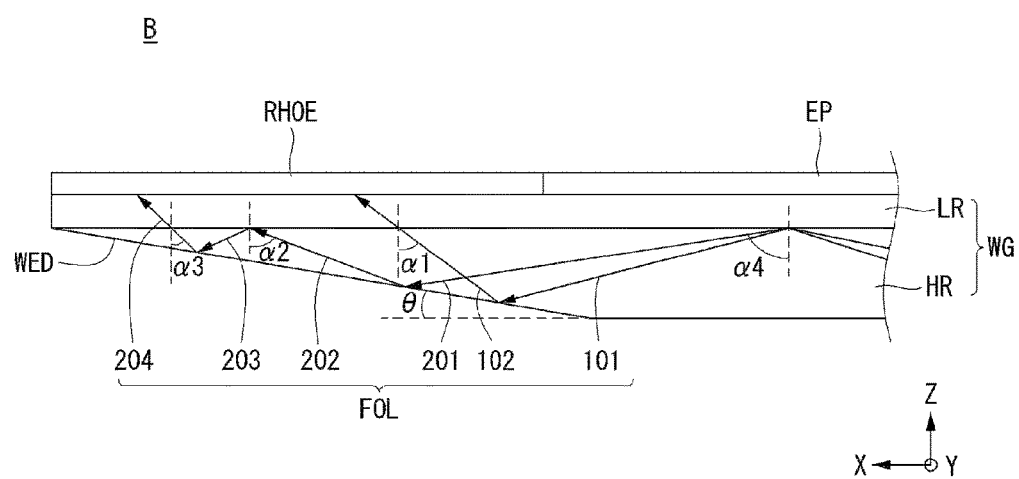
FIG. 9 is an enlarged side view illustrating that a divergent light beam passes through an inclined portion of a high refraction film and is incident on a second member in an area B of the ultrathin light unit illustrated in FIG. 6 according to the first embodiment of the present invention.
Figure 10:
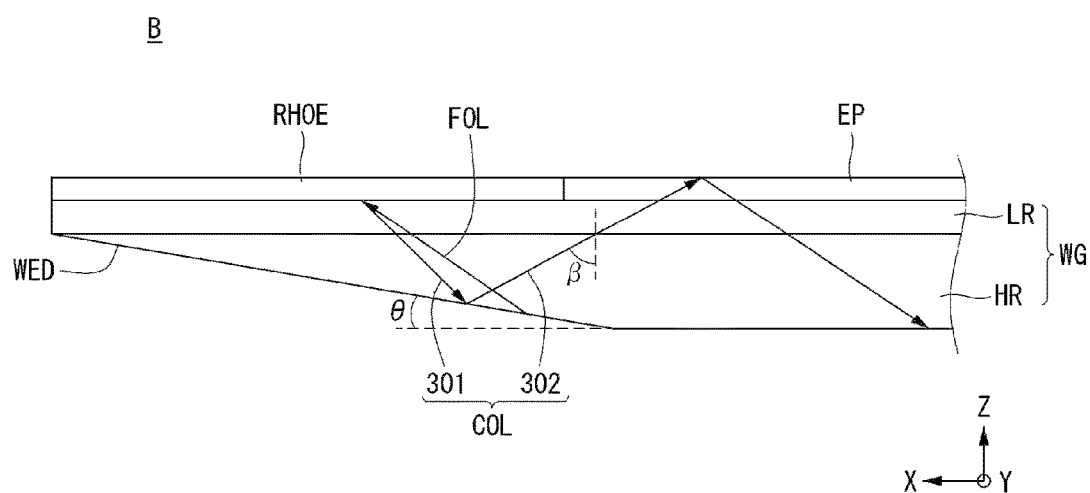
FIG. 10 is an enlarged side view illustrating that a collimated light beam emitted from a second member travels in an area B of the ultrathin light unit illustrated in FIG. 6 according to the first embodiment of the present invention.

A travelling method of light in the area B will not be described in detail. FIG. 9 is an enlarged side view illustrating that a divergent light beam passes through the inclined portion of the high refraction film and is incident on the second member in the area B of the ultrathin light unit illustrated in FIG. 6 according to the first embodiment of the invention. FIG. 10 is an enlarged side view illustrating that a collimated light beam emitted from the second member travels in the area B of the ultrathin light unit illustrated in FIG. 6 according to the first embodiment of the invention.

Referring to FIG. 9, divergent light beams FOL travelling inside the high refraction film HR through the total reflection are incident on the inclined portion WED of the high refraction film HR. The divergent light beams FOL are incident on the inclined portion WED at an angle greater than the critical angle, which makes the total reflection occur at the interface between the high refraction film HR and the low refraction film LR. The divergent light beams FOL incident on the inclined portion WED are adjusted by the slope (of an angle θ) of the inclined portion WED and are emitted to the second member RHOE at an adjusted angle. Namely, the inclined portion WED adjusts the angle of the divergent light beam FOL, and the divergent light beam FOL emitted at the adjusted angle is transmitted by the upper surface of the high refraction film HR and is incident on the second member RHOE. The inclined angle θ of the inclined portion WED is beneficially 1° to 5°. In this instance, the divergent light beam FOL is reflected by the inclined portion WED and is incident on the second member RHOE in the vertical direction (a direction of +Z-axis) as a collimated light beam.

For example, a first divergent light beam 101 totally reflected from the upper surface of the high refraction film HR is again totally reflected from the surface of the inclined portion WED and converted into a second divergent light beam 102, and the second divergent light beam 102 is transmitted by the upper surface of the high refraction film HR and is incident on the second member RHOE. In this instance, an incident angle $\alpha 1$ of the second divergent light beam 102 incident on the second member RHOE is less than the critical angle of the total reflection at the interface between the high refraction film HR and the low refraction film LR.

In another example, a third divergent light beam 201 totally reflected from the upper surface of the high refraction film HR is again totally reflected from the surface of the inclined portion WED and converted into a fourth divergent light beam 202. The fourth divergent light beam 202 is totally reflected from the upper surface of the high refraction film HR and converted into a fifth divergent light beam 203, and the fifth divergent light beam 203 is again totally reflected from the surface of the inclined portion WED and converted into a sixth divergent light beam 204. The sixth divergent light beam 204 is transmitted by the upper surface of the high refraction film HR and is incident on the second member RHOE. In this instance, an incident angle $\alpha 2$ of the fourth divergent light beam 202 totally reflected from the upper surface of the high refraction film HR is greater than the critical angle of the total reflection at the interface between the high refraction film HR and the low refraction film LR and is less than a reflective angle $\alpha 4$ of the third divergent light beam 201. Further, an incident angle $\alpha 3$ of the sixth divergent light beam 204 incident on the second member RHOE is less than the critical angle of the total reflection at the interface between the high refraction film HR and the low refraction film LR.

As described above, the inclined portion WED adjusts the refractive angles of the divergent light beams incident on the inclined portion WED through the total reflection. When the incident angle of the divergent light beam, which is emitted at the adjusted angle and is incident on the upper surface of the high refraction film HR, is greater than the critical angle of the total reflection at the interface between the high refraction film HR and the low refraction film LR, the angle of the divergent light beam is again adjusted between the upper surface of the high refraction film HR and the inclined portion WED through the total reflection. When the incident angle of the divergent light beam, which is emitted at the adjusted angle and is incident on the upper surface of the high refraction film HR, is less than the critical angle of the total reflection at the interface between the high refraction film HR and the low refraction film LR, the divergent light beam is transmitted by the upper surface of the high refraction film HR.

In the embodiment disclosed herein, the cross-section of the lower surface of the inclined portion WED is shown as a straight line in the drawings. However, the embodiment of the invention is not limited thereto. The cross-section of the lower surface of the inclined portion WED may have any shape as long as the inclined portion WED can perform the above-described function. For example, the cross-section of the lower surface of the inclined portion WED may have a curved shape, of which a lower portion is depressed.

Referring to FIG. 10, a divergent light beam FOL, which is collimated in the vertical direction (the direction of +Z-axis), diverges along the +X-axis, and is incident on the second member RHOE, is collimated by an optical diffraction pattern recorded on the second member RHOE in the horizontal direction and is emitted to the inside of the high refraction film HR. Namely, a light beam 301 emitted from the second member RHOE is a collimated light beam COL in the vertical and horizontal directions.

The collimated light beam 301 incident on the inside of the high refraction film HR is reflected by the inclined portion WED and is converted into a collimated light beam 302, of which an angle is adjusted by the inclined portion WED. The collimated light beam 302 having the adjusted angle travels in the direction of -X-axis through the total reflection between an interface between the upper surface of the ultrathin light guide film LGF and an air and an interface between the lower surface of the ultrathin light guide film LGF and the air. In this instance, an incident angle β of the collimated light beam 302, of which the angle is adjusted by the inclined portion WED, is desired to be less than the critical angle, which makes the total reflection occur at the interface between the high refraction film HR and the low refraction film LR, so that the collimated light beam 302 can be transmitted by the upper surface of the high refraction film HR. Further, the incident angle β of the collimated light beam 302 is desired to be greater than the critical angle, which makes the total reflection occur at the interfaces between the upper and lower surfaces of the ultrathin light guide film LGF and the air.

Accordingly, the second member RHOE beneficially satisfies the conditions, in which the collimated light beam is emitted from the second member RHOE at the angle adjusted by the inclined portion WED, is not totally reflected at the interface between the high refraction film HR and the low refraction film LR, and is totally reflected between the interface between the upper surface of the ultrathin light guide film LGF and the air and the interface between the lower surface of the ultrathin light guide film LGF and the air, and at the same time, forms a holographic pattern making the collimated light beam in the horizontal direction. For example, the second member RHOE may be a holographic film recording an interference pattern made using the divergent light beam FOL as a reference light beam and using the collimated light beam 301 as an object light beam.

In this instance, the formation area of the second member RHOE may not be an area for implementing a controlled viewing window. Thus, the second member RHOE is beneficially formed only in a minimum area capable of receiving the divergent light beam FOL, which passes through the inclined portion WED and is incident. Namely, the second member RHOE has beneficially the same width as the base film WG, and a length of the second member RHOE in the direction of X-axis is equal to or less than a length of the inclined portion WED in the direction of X-axis.

Figure 11A:
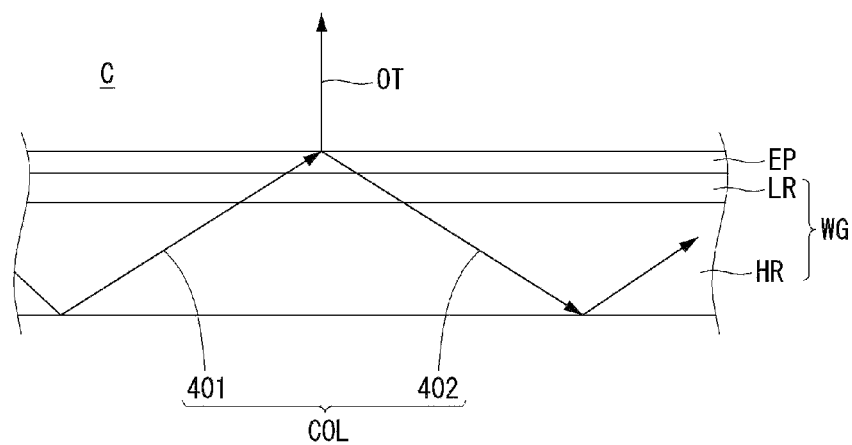
FIGS. 11A and 11B are enlarged side views illustrating that a collimated light beam travelling through the total reflection is emitted to an upper surface in an area C of the ultrathin light unit illustrated in FIG. 6 according to the first embodiment of the present invention.
Figure 11B:
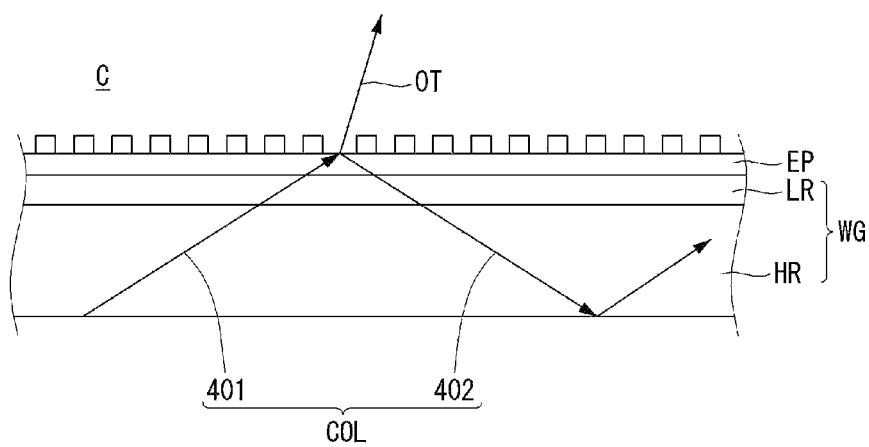

A travelling method of light in the area C will now be described in detail. FIGS. 11A and 11B are enlarged side views illustrating that a collimated light beam travelling through the total reflection is emitted to the upper surface in the area C of the ultrathin light unit illustrated in FIG. 6 according to the first embodiment of the invention.

Referring to FIG. 11A, the collimated light beam COL emitted from the second member RHOE travels in the direction of -X-axis through the total reflection. In the process, when the third member EP, for example, a holographic pattern is formed on the upper surface of the base film WG, most of a collimated light beam 401 is totally reflected form the upper surface of the base film WG. However, a portion of the collimated light beam 401 proportional to a diffraction efficiency of the third member EP is emitted to the outside as a light beam OT. Namely, a portion of the collimated light beam COL travelling through the total reflection reacts to the third member EP and is emitted to the outside. For example, when the diffraction efficiency of the third member EP is 5%, 5% of the collimated light beam 401 is emitted to the outside of the ultrathin light guide film LGF as the light beam OT, and a collimated light beam 402 corresponding to remaining 95% of the collimated light beam 401 is totally reflected and travels inside the ultrathin light guide film LGF in the direction of -X-axis. Through such a method, each time the collimated light beam 401 is incident on the third member EP, 5% of the collimated light beam 401 may be emitted. Further, the third member EP has beneficially a holographic pattern, which makes the light beam OT travel in a direction vertical to the surface of the ultrathin light guide film LGF.

Referring to FIG. 11B, when the third member EP has a grating pattern, the grating pattern is beneficially formed of a material which makes the light beam OT be refracted in a nearly vertical direction. Namely, the collimated light beam 401 has an angle inclined to the Z-axis and is emitted to the upper surface of the base film WG. In this instance, the third member EP has beneficially a grating pattern which makes an emission direction of the finally emitted light beam OT be refracted in a direction near to the Z-axis.

Figure 12:
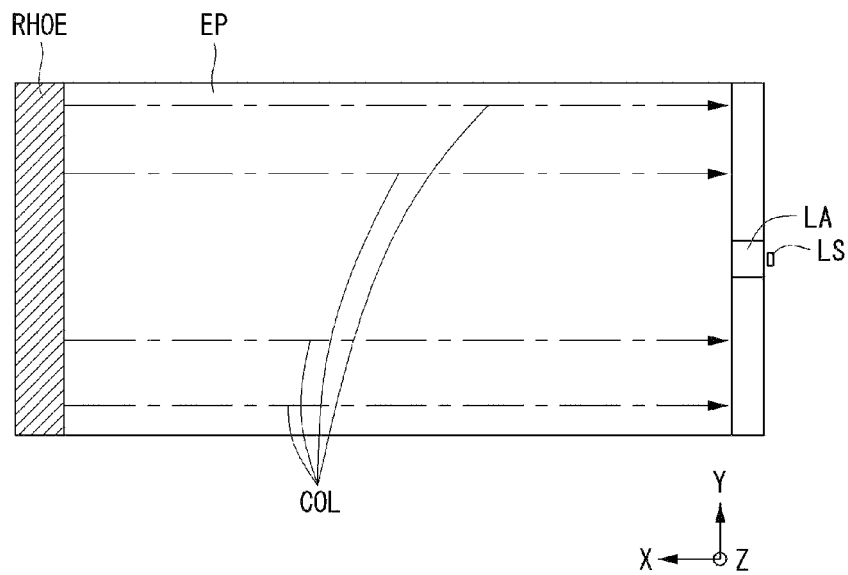
FIG. 12 is a plane view illustrating that a collimated light beam emitted from a second member travels on X-Y plane.

Referring to FIG. 12, the collimated light beam COL emitted from the second member RHOE in the vertical and horizontal directions travels in the direction of -X-axis. In this instance, a portion of the collimated light beam COL reacting with the third member EP is emitted to the upper surface of the third member EP and is implemented as a light beam.

Referring back to FIGS. 9 to 11B, on the X-Y plane, the divergent light beam FOL may not satisfy the total reflection conditions because of the collimated light beam COL and the inclined portion WED, and may not be totally reflected at the interface between the high refraction film HR and the low refraction film LR. As a result, the divergent light beam FOL is refracted and reflected from the upper surface of the high refraction film HR. Hence, most of the divergent light beam FOL is refracted to the inside of the low refraction film LR, and a portion of the divergent light beam FOL is again reflected to the inside of the high refraction film HR.

A complex optical phenomenon may actually occur in the upper surface of the high refraction film HR. For brevity and ease of understanding, this embodiment is, however, described on the assumption that the divergent light beam FOL and the collimated light beam COL enter into the low refraction film LR when the total reflection is not carried out in the upper surface of the high refraction film HR. Further, actually, the divergent light beam FOL and the collimated light beam COL are refracted and then enter into the low refraction film LR. Also, for brevity and ease of understanding, this embodiment is described on the assumption that the divergent light beam FOL and the collimated light beam COL propagate rectilinearly substantially without refraction. Actually, when the low refraction film LR is very thin, an influence of a refraction angle is little.

The collimated light beam COL, which is totally reflected from the upper surface of the ultrathin light guide film LGF and is incident on the inside of the low refraction film LR, is reflected and refracted at the interface between the high refraction film HR and the low refraction film LR. However, because a real amount of reflection of the collimated light beam COL is very small, this embodiment is described on the assumption that all of the collimated light beam COL is refracted to the inside of the high refraction film HR and enters into the high refraction film HR for brevity and ease of understanding.

As described above, the ultrathin light unit according to the first embodiment of the present invention includes the ultrathin light guide film LGF, the ultrathin light guide film LGF including the base film WG including the high refraction film HR having the inclined portion WED at one side of the high refraction film HR and the flat portion FLAT extended from the inclined portion WED to the other side of the high refraction film HR and the low refraction film LR formed on the high refraction film HR; the second member RHOE which is formed at one side of the upper surface of the base film WG and has the first width W; the first member LA which is formed in the middle of the other side of the upper surface of the base film WG and is separated from the second member RHOE by a predetermined distance; and the third member EP which is formed between the second member RHOE and the first member LA on the upper surface of the base film WG and has the first width W. The ultrathin light unit according to the first embodiment of the invention further includes the light source LS positioned adjacent to the first member LA at the side of the flat portion FLAT.

The ultrathin light unit according to the first embodiment of the present invention can provide a collimated light corresponding to a surface area of the third member EP using a holographic technology. Thus, the first embodiment of the present invention can provide the ultrathin light unit emitting a collimated light. Further, the first embodiment of the invention can provide the ultrathin light unit that can have a very thin thickness and a flexibility by using a flexible film.

<Second Embodiment>

An ultrathin light unit according to the second embodiment of the present invention can implement light having either a narrow viewing angle or a wide viewing angle. Namely, the second embodiment of the present invention can provide a film type ultrathin light unit capable of controlling a viewing window depending on a user's demand by selectively implementing a controlled viewing window mode (narrow viewing angle) and a general light scattering mode (wide viewing angle).

The ultrathin light unit according to the second embodiment of the present invention will now be described in detail with reference to FIGS. 13 and 14.

Figure 13:
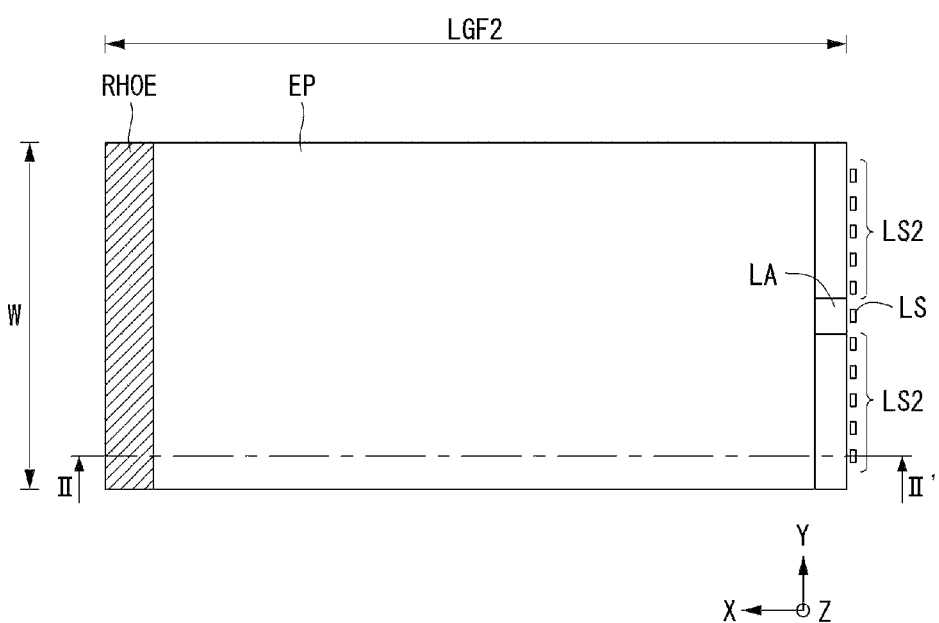
FIG. 13 is a plane view of an ultrathin light unit according to the second embodiment of the present invention.
Figure 14:
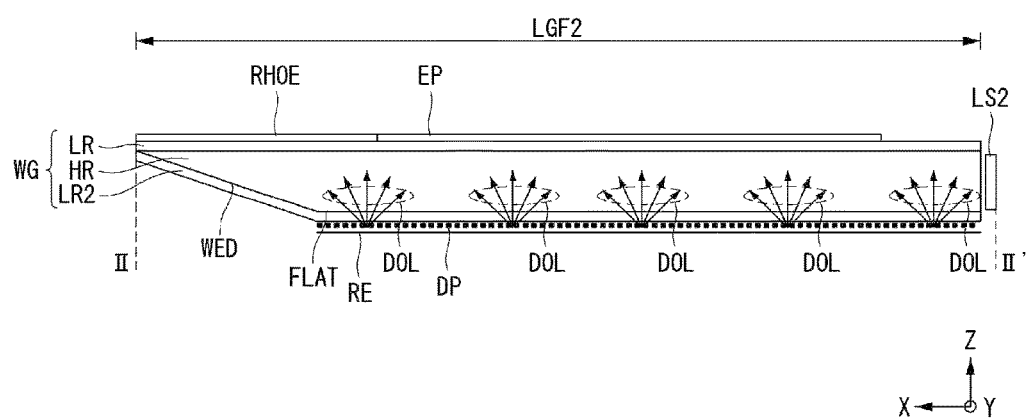
FIG. 14 is an enlarged side view taken along line II-II' of FIG. 13.

FIG. 13 is a plane view of the ultrathin light unit according to the second embodiment of the present invention, and FIG. 14 is an enlarged side view taken along line II-II' of FIG. 13.

Referring to FIGS. 13 and 14, the ultrathin light unit according to the second embodiment of the present invention includes an ultrathin light guide film LGF2 and light sources LS and LS2.

The ultrathin light guide film LGF2 according to the second embodiment of the present invention further includes a lower low refraction film LR2 formed on a lower surface of a high refraction film HR and a fourth member DP, which is formed on a lower surface of the lower low refraction film LR2 and is positioned at a location corresponding to a flat portion FLAT of the high refraction film HR, in addition to configuration of the ultrathin light guide film according to the first embodiment of the present invention. The fourth member DP functions to scatter the light incident on the fourth member DP. A refractive index of the lower low refraction film LR2 is beneficially less than a refractive index of the high refraction film HR and a refractive index of a low refraction film LR. For example, the high refraction film HR may be formed of polycarbonate having a refractive index of 1.6, the low refraction film LR may be formed of UV resin having a refractive index of 1.43, and the second member RHOE and the third member EP may be formed of a material having a refractive index of 1.5. Further, the lower low refraction film LR2 may be formed of UV resin having a refractive index of 1.4. Other materials having various refractive indexes may be used for these elements.

A reflective film RE may be formed under the fourth member DP. The reflective film RE reflects the light upwardly (for example, in a direction of +Z-axis) which is scattered by the fourth member DP and is emitted downwardly (for example, in a direction of −Z-axis). The reflective film RE according to the second embodiment of the present invention can reduce or prevent a loss of the scattering light emitted downwardly and thus improve light efficiency.

The light source LS for the controlled viewing window mode and the light source LS2 for the light scattering mode are disposed on the side of the high refraction film HR. The controlled viewing window mode light source LS may be positioned in the middle of the side of the high refraction film HR, and the light scattering mode light source LS2 may be disposed on both sides of the controlled viewing window mode light source LS in a direction of Y-axis.

The light scattering mode light source LS2 may use an LED in the same manner as the controlled viewing window mode light source LS. Herein, a divergent LED is described, but the present invention is not limited thereto and may include various types of LEDs including a direct LED. By using such a divergent LED, the light efficiency can be improved, and the manufacturing cost can be reduced. The light scattering mode light source LS2 may use a plurality of LEDs to implement an ultrathin light unit having a high luminance, if desired.

The ultrathin light unit according to the second embodiment of the present invention may selectively implement the controlled viewing window mode and the light scattering mode.

When the controlled viewing window mode is selected, the light from the controlled viewing window mode light source LS is incident on the ultrathin light guide film LGF2. The incident light is collimated in the same method as the first embodiment of the present invention and is emitted as a collimated light. Thus, the light incident from the controlled viewing window mode light source LS concentrates as a collimated light on a previously determined viewing window through the third member EP of the ultrathin light guide film LGF2.

When the light scattering mode is selected, the light from the light scattering mode light source LS2 is incident on the ultrathin light guide film LGF2. The incident light emits the light to the upper surface of the ultrathin light guide film LGF2 while travelling inside the ultrathin light guide film LGF2 through the total reflection as in a general light guide plate.

More specifically, because the first member LA is not formed on an upper surface of one side of the base film WG adjacent to the light scattering mode light source LS2, among incident light beams, not only an incident light beam having an angle greater than a critical angle, which makes the total reflection occur at an interface between the high refraction film HR and the low refraction film LR, but also an incident light beam having an angle less than the critical angle may travel inside the base film WG through the total reflection.

Among the incident light beams travelling inside the base film WG through the total reflection, a light beam incident on the fourth member DP may be scattered and emitted on the ultrathin light guide film LGF2, and a light beam, which is incident on an inclined portion WED and the second member RHOE and is collimated in the vertical and horizontal directions, may be emitted on the ultrathin light guide film LGF2 by the third member EP. The light emitted on the ultrathin light guide film LGF2 as a scattering light beam DOL scattered by the fourth member DP has a wide viewing angle.

As described above, the ultrathin light unit according to the second embodiment of the present invention includes the ultrathin light guide film LGF2, the ultrathin light guide film LGF2 including the base film WG including the high refraction film HR having the inclined portion WED at one side of the high refraction film HR and the flat portion FLAT extended from the inclined portion WED to the other side of the high refraction film HR, the low refraction film LR formed on the high refraction film HR, and the lower low refraction film LR2 formed under the high refraction film HR; the second member RHOE which is formed at one side of the upper surface of the base film WG and has a first width W; the first member LA which is formed in the middle of the other side of the upper surface of the base film WG and is separated from the second member RHOE by a predetermined distance; the third member EP which is formed between the second member RHOE and the first member LA on the upper surface of the base film WG and has the first width W; and the fourth member DP which is formed on the lower surface of the lower low refraction film LR2 and is positioned at the location corresponding to the flat portion FLAT. The ultrathin light unit according to the second embodiment of the present invention further includes the light source LS positioned adjacent to the first member LA on the side of the flat portion FLAT and the light scattering mode light source LS2 positioned on both sides of the light source LS in a width direction. The ultrathin light unit according to the second embodiment of the present invention may further include the reflective film RE formed under the fourth member DP.

The ultrathin light unit according to the second embodiment of the present invention can provide a collimated light corresponding to a surface area of the third member EP using a holographic technology and control a viewing window depending on the user's selection. Further, the second embodiment of the present invention can provide the ultrathin light unit having a very thin thickness and a flexibility by using a flexible film.

<Third Embodiment>

An ultrathin light unit according to the third embodiment of the invention will now be described in detail with reference to FIGS. 15 to 17.

Figure 15:
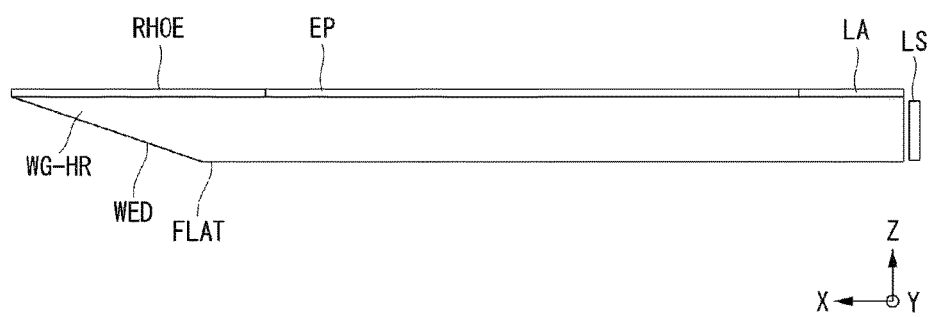
FIGS. 15 to 17 are side views of an ultrathin light unit according to the third embodiment of the present invention.
Figure 16:
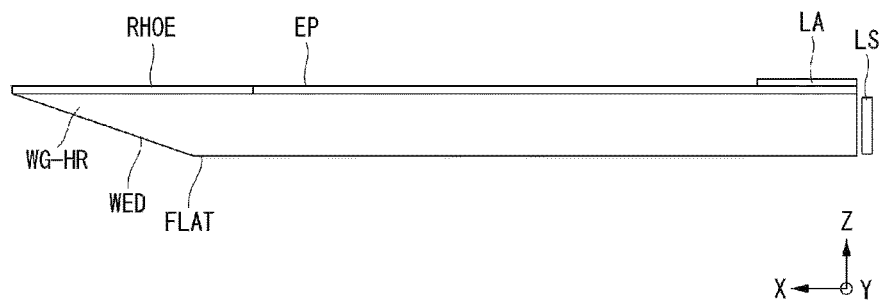
Figure 17:
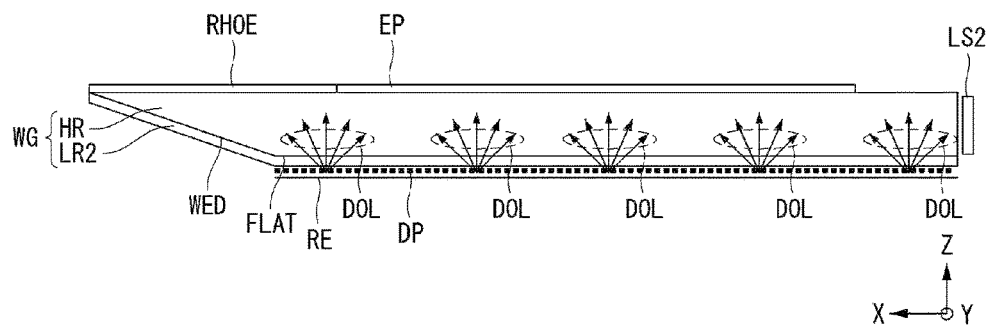

FIGS. 15 to 17 are side views of the ultrathin light unit according to the third embodiment of the invention.

The ultrathin light unit according to the third embodiment of the present invention may not include the low refraction film LR, different from the ultrathin light units according to the first and second embodiments of the present invention. Namely, when refractive indices of a third member EP and a second member RHOE are less than a refractive index of a high refraction film HR, the low refraction film LR may be omitted.

Referring to FIGS. 16 and 17, the ultrathin light unit according to the third embodiment of the present invention includes an ultrathin light guide film LGF, the ultrathin light guide film LGF including a base film WG including a high refraction film HR having an inclined portion WED at one side of the high refraction film HR and a flat portion FLAT extended from the inclined portion WED to the other side of the high refraction film HR; a second member RHOE which is formed on the inclined portion WED at one side of the high refraction film HR and has a first width; a first member LA which is formed in the middle of the other side of an upper surface of the flat portion FLAT and is separated from the second member RHOE by a predetermined distance; and a third member EP which is formed on the upper surface of the flat portion FLAT and has the first width. The ultrathin light unit according to the third embodiment of the present invention further includes a light source LS positioned adjacent to the first member LA on the side of the flat portion FLAT.

As illustrated in FIG. 15, the third member EP may be formed between the second member RHOE and the first member LA on the upper surface of the base film WG. Alternatively, as illustrated in FIG. 16, the third member EP may be formed on an entire upper surface of the base film WG, on which the second member RHOE is not formed, and the first member LA may be formed on the third member EP and may be formed in the middle of the other side separated from the second member RHOE by a predetermined distance.

Referring to FIG. 17, when an ultrathin light unit having a wide viewing angle and a narrow viewing angle is implemented by the user's selection, the ultrathin light unit may further include a lower low refraction film LR2 formed on a lower surface of the high refraction film HR and a fourth member DP, which is formed on a lower surface of the lower low refraction film LR2 and is positioned opposite the flat portion FLAT of the high refraction film HR. The ultrathin light unit may further include the reflective film RE formed on the lower surface of the fourth member DP.

The ultrathin light unit according to the third embodiment of the present invention implements the light through the same process as the first and second embodiments of the invention, except that the low refraction film LR is omitted.

The third embodiment of the present invention can provide the ultrathin light unit thinner than the first and second embodiments of the present invention. However, when a divergence mode is performed in the third embodiment of the present invention without the low refraction film LR, the totally reflected divergent light may react with the third member EP and may be scattered. Thus, the ultrathin light unit according to the third embodiment of the present invention beneficially includes the low refraction film LR.

The ultrathin light unit according to the third embodiment of the present invention can provide a collimated light corresponding to a surface area of the third member EP using a holographic technology and control a viewing window depending on the user's selection. Further, the third embodiment of the present invention can provide the ultrathin light unit having a very thin thickness and a flexibility by using a flexible film.

<Fourth Embodiment>

An ultrathin flat panel display according to the fourth embodiment of the present invention will now be described with reference to FIG. 18.

Figure 18:
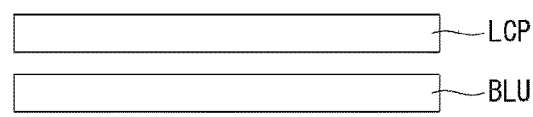
FIG. 18 schematically illustrates an ultrathin flat panel display according to the fourth embodiment of the present invention.

FIG. 18 schematically illustrates the ultrathin flat panel display according to the fourth embodiment of the present invention.

The ultrathin flat panel display according to the fourth embodiment of the present invention includes a display panel LCP and a light unit BLU positioned in the rear of the display panel LCP. The display panel LCP may be a liquid crystal display panel with the light unit BLU. Other display panels may be used. The light unit BLU may be one of the ultrathin light units according to the first, second and third embodiments of the present invention.

Because a portion of the light unit BLU emitting light is a formation area of the third member EP, the display panel LCP formed on an upper surface of the light unit BLU may be positioned opposite the third member EP of the light unit BLU.

The display device including the ultrathin light unit according to the first embodiment or the third embodiment (illustrated in FIGS. 15 and 16) of the present invention can control the viewing window and thus may be a security display device for providing display information only for a special viewer.

Further, the display device including the ultrathin light unit according to the second embodiment or the third embodiment (illustrated in FIG. 17) of the present invention can switch between the controlled viewing window mode and the light scattering mode depending on the user's demand, and thus, can provide a multifunctional display device having a narrow viewing angle and a wide viewing angle.

An ultrathin flat panel display applied with a holographic technology according to an embodiment of the present invention is capable of reducing or minimizing a loss of light. Such an ultrathin flat panel display can be applied to an auto-stereoscopic image display, a multi-view display, or a security enhancement display, etc.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device having a display panel and a light unit, the light unit comprising:

a high refraction film including an inclined portion at a first side of the high refraction film and a flat portion extended from the inclined portion to a second side of the high refraction film;

a second member on the inclined portion at the first side of the high refraction film and having a first width;

a first member on the flat portion in a middle of the second side of the high refraction film and separated from the second member;

a third member on the flat portion and having the first width; and a light source adjacent to the first member at a side of the flat portion, wherein the first member absorbs a transmitted light having an incident angle less than a critical angle, which makes a total reflection occur at an interface between the high refraction film and the third member, among incident light emitted from the light source and being incident on the side of the flat portion.

2. The display device of claim 1, wherein the first member is disposed on the third member.

3. The display device of claim 1, wherein the third member is disposed between the second member and the first member.

4. The display device of claim 3, wherein the inclined portion has an inclined angle for adjusting a reflection angle of a divergent light, which has an incident angle greater than the critical angle among the incident light and travels inside the high refraction film through the total reflection, so that the divergent light has an incident angle less than the critical angle and is incident on the second member.

5. The display device of claim 4, wherein the second member has a holographic pattern for converting the divergent light, which is collimated in a vertical direction by the inclined portion and is incident on the second member, into a collimated light collimated in vertical and horizontal directions, and emitting the collimated light having a predetermined condition, and wherein the predetermined condition is a condition, in which the collimated light, which is emitted to the inclined portion and is again reflected by adjusting an angle due to the inclined portion, is transmitted by the high refraction film and is totally reflected at an interface between the third member and an air.

6. The display device of claim 5, wherein the third member has a holographic pattern for emitting a portion of the collimated light again reflected by the inclined portion to the outside of the third member.

7. A display device having a display panel and a light unit, the light unit comprising:

a high refraction film including an inclined portion at a first side of the high refraction film and a flat portion extended from the inclined portion to a second side of the high refraction film;

a second member on the inclined portion at the first side of the high refraction film and having a first width;

a first member on the flat portion in a middle of the second side of the high refraction film and separated from the second member;

a third member on the flat portion and having the first width;

a light source adjacent to the first member at a side of the flat portion; and a low refraction film opposite an upper surface of the high refraction film, wherein the first member absorbs a transmitted light having an incident angle less than a critical angle, which makes a total reflection occur at an interface between the high refraction film and the low refraction film, among incident light emitted from the light source and being incident on the side of the flat portion.

8. The display device of claim 7, wherein the inclined portion has an inclined angle for adjusting a reflection angle of a divergent light, which has an incident angle greater than the critical angle among the incident light and travels inside the high refraction film through the total reflection, so that the divergent light has an incident angle less than the critical angle and is incident on the second member.

9. The display device of claim 8, wherein the second member has a holographic pattern for converting the divergent light, which is collimated in a vertical direction by the inclined portion and is incident on the second member, into a collimated light collimated in vertical and horizontal directions, and emitting the collimated light having a predetermined condition, and wherein the predetermined condition is a condition, in which the collimated light, which is emitted to the inclined portion and is again reflected by adjusting an angle due to the inclined portion, is transmitted by the high refraction film and the low refraction film and is totally reflected at an interface between the third member and an air.

10. The display device of claim 9, wherein the third member has a holographic pattern for emitting a portion of the collimated light again reflected by the inclined portion to the outside of the third member.

11. The display device of claim 1, further comprising a lower first member disposed under the high refraction film and positioned opposite the first member.

12. The display device of claim 7, further comprising a lower first member disposed under the high refraction film and positioned opposite the first member.

13. The display device of claim 1, further comprising:
a light scattering mode light source disposed on both sides of the light source in a width direction at the side of the flat portion;
a lower low refraction film disposed on a lower surface of the high refraction film; and
a fourth member positioned opposite the flat portion on a lower surface of the lower low refraction film.

14. The display device of claim 7, further comprising:
a light scattering mode light source disposed on both sides of the light source in a width direction at the side of the flat portion;
a lower low refraction film disposed on a lower surface of the high refraction film; and
a fourth member positioned opposite the flat portion on a lower surface of the lower low refraction film.

15. The display device of claim 13, further comprising a reflective film disposed under the fourth member.

16. The display device of claim 14, further comprising a reflective film disposed under the fourth member.

17. A light unit for a display device comprising:
a high refraction film including an inclined portion at a first side of the high refraction film and a flat portion extended from the inclined portion to a second side of the high refraction film;
a second member on the inclined portion at the first side of the high refraction film and having a first width;
a first member on the flat portion in a middle of the second side of the high refraction film and separated from the second member;
a third member on the flat portion and having the first width; and
a light source adjacent to the first member at a side of the flat portion,
wherein the first member absorbs a transmitted light having an incident angle less than a critical angle, which makes a total reflection occur at an interface between the high refraction film and the third member, among incident light emitted from the light source and being incident on the side of the flat portion.

* * * * *